United States Patent [19]
Yagi et al.

[11] Patent Number: 5,384,809
[45] Date of Patent: Jan. 24, 1995

[54] ERROR CONTROL CODING ARRANGEMENT FOR DIGITAL COMMUNICATIONS SYSTEM

[75] Inventors: Toshiharu Yagi, Tokyo; Shuzo Kato; Shuji Kubota, both of Kanagawa, all of Japan

[73] Assignees: Nippon Telegraph and Telephone Corporation; NEC Corporation, Tokyo, Japan

[21] Appl. No.: 184,341

[22] Filed: Dec. 23, 1993

Related U.S. Application Data

[63] Continuation of Ser. No. 709,498, Jun. 3, 1991, abandoned.

[30] Foreign Application Priority Data

Jun. 1, 1990 [JP] Japan .................................. 2-144874

[51] Int. Cl.$^6$ ............................................. H04L 27/00
[52] U.S. Cl. ......................................... 375/39; 375/27; 375/38; 371/43
[58] Field of Search ............................. 375/27, 38–39, 375/54, 67, 86; 329/304; 332/103; 371/37.8, 43; 455/60

[56] References Cited

U.S. PATENT DOCUMENTS

| | | | |
|---|---|---|---|
| 4,462,101 | 7/1984 | Yasuda et al. | 371/43 |
| 4,489,418 | 12/1984 | Mazo | 375/27 |
| 4,534,040 | 8/1985 | Thapar | 375/39 |
| 4,581,748 | 4/1986 | Sasaki et al. | 375/39 |
| 4,873,703 | 10/1989 | Tretter | 371/43 |

OTHER PUBLICATIONS

IEEE Proceedings F. Communications, Radar & Signal Processing vol. 134, No. 1, pp. 43–52.

*Primary Examiner*—Stephen Chin
*Assistant Examiner*—Young Tse
*Attorney, Agent, or Firm*—Ostrolenk, Faber, Gerb & Soffen

[57] ABSTRACT

A serial-parallel converter is arranged to convert an information sequence into a plurality of bit sequences. Two convolutional encoders are provided which respectively receive bit sequences from the serial-parallel converter. Each of the two convolutional encoders outputs first and second bit sequences. First parallel-serial converter receives the first bit sequences and converts them into third bit sequence, while second parallel-serial converter receives the second bit sequences and converts them into fourth bit sequence. The third and fourth bit sequences are used to modulate two carriers with a phase difference of $\pi/2$ radians.

3 Claims, 12 Drawing Sheets

FIG.9

| | | | | | | |
|---|---|---|---|---|---|---|
| D51 | γP1 | γP2 | γP3 | γP4 | γP5 | γP6 |
| D52 | γQ1 | γQ2 | γQ3 | γQ4 | γQ5 | γQ6 |

| | | | |
|---|---|---|---|
| D61 | γP1 | γP3 | γP5 |
| D62 | γQ1 | γQ3 | γQ5 |
| D63 | γP2 | γP4 | γP6 |
| D64 | γQ2 | γQ4 | γQ6 |

| | | | |
|---|---|---|---|
| D71 | B1 | B3 | B5 |
| D72 | B2 | B4 | B6 |

| | | | | | | |
|---|---|---|---|---|---|---|
| D80 | B1 | B2 | B3 | B4 | B5 | B6 |

⟶ TIME

FIG.10

| | | | | | | |
|---|---|---|---|---|---|---|
| D51 | $\overline{γQ1}$ | $\overline{γQ2}$ | $\overline{γQ3}$ | $\overline{γQ4}$ | $\overline{γQ5}$ | $\overline{γQ6}$ |
| D52 | γP1 | γP2 | γP3 | γP4 | γP5 | γP6 |

| | | | |
|---|---|---|---|
| D61 | $\overline{γQ1}$ | $\overline{γQ3}$ | $\overline{γQ5}$ |
| D62 | γP1 | γP3 | γP5 |
| D63 | $\overline{γQ2}$ | $\overline{γQ4}$ | $\overline{γQ6}$ |
| D64 | γP2 | γP4 | γP6 |

⟶ TIME

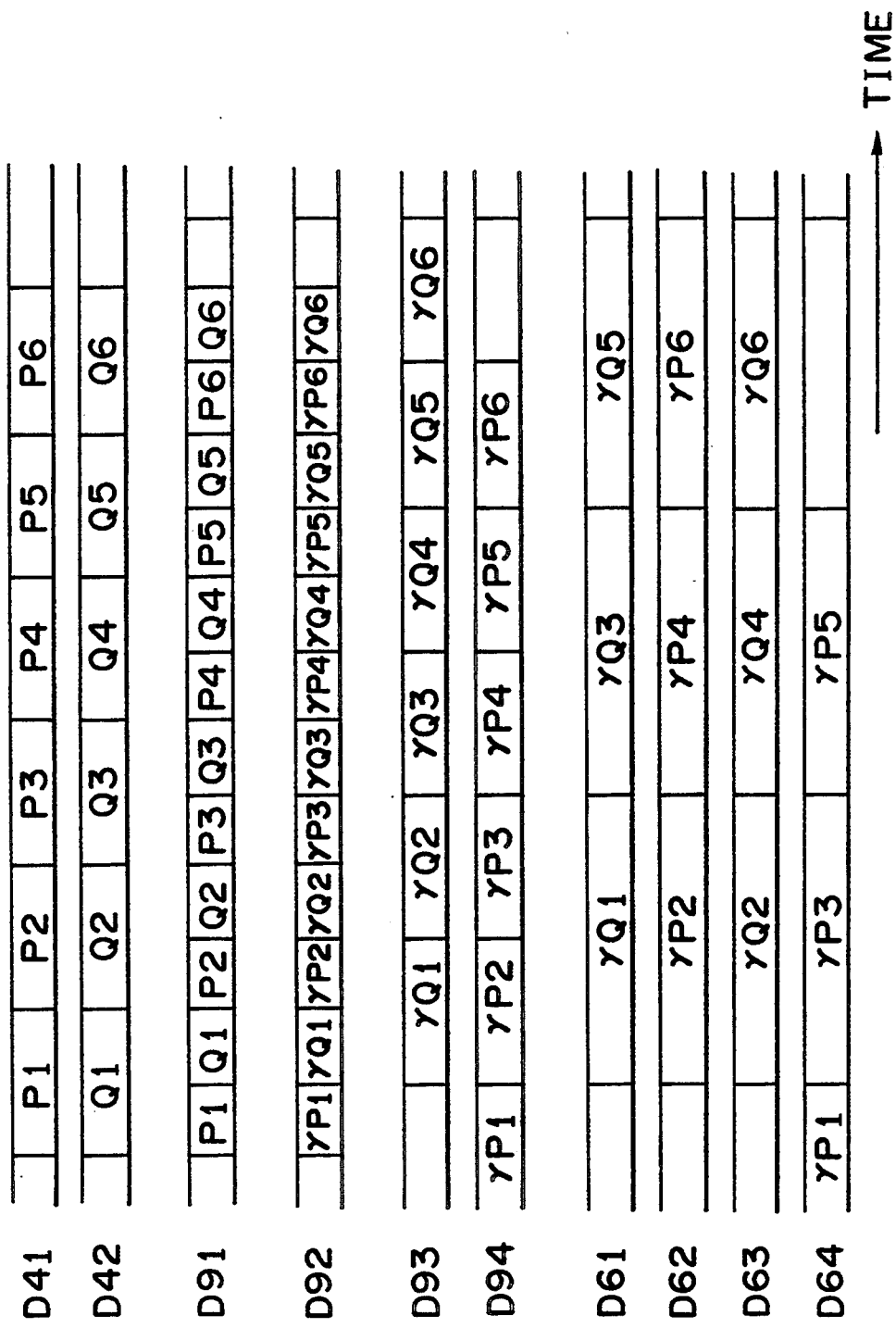

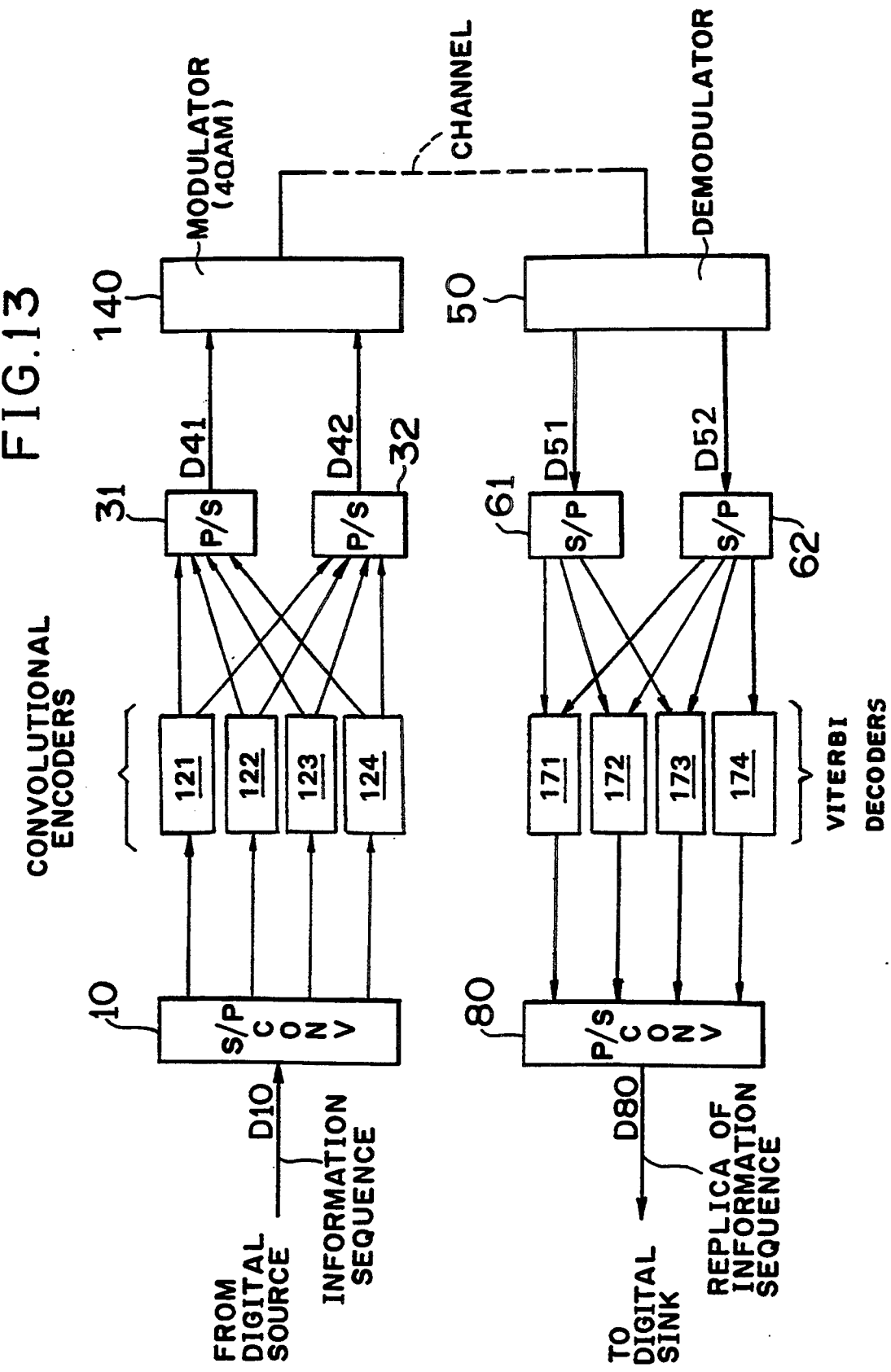

ERROR CONTROL CODING ARRANGEMENT FOR DIGITAL COMMUNICATIONS SYSTEM

This is a continuation of application Ser. No. 07/709,498, filed Jun. 3, 1991, now abandoned.

BACKGROUND OF THE INVENTION

1. Field of the Invention

The present invention relates generally to a digital data communications system, and more specifically to an error control coding arrangement wherein convolutional codes transmitted over QAM or PSK digital channels, are decoded using a plurality of Viterbi decoders (for example).

2. Description of the Prior Art

In recent years, there has been an increasing demand for efficient and reliable digital data transmission. This demand has been accelerated by the emergence of large-scale, high-speed data networks for the exchange and processing of digital information in various fields.

It has been widely recognized that maximum likelihood decoding using Viterbi algorithms of convolutional codes, is an effective, attractive error correcting technique for a digital communications system. The hardware size of a Viterbi decoder increases with an increase in a constraint length (K) thereof. At present time, a Viterbi decoder with K=7 is practically used, and the maximum decoding speed thereof falls within a range from 15 Mbps (Mega bits per second) to 25 Mbps. It follows that an information transmission rate is limited by the maximum decoding speed.

In order to increase the information transmission rate, there has been proposed an error control arrangement which includes a plurality of convolutional encoders and a plurality of Viterbi decoders. Before turning to the present invention it is deemed advantageous to discuss such a prior art arrangement with reference to FIGS. 1 to 6.

As shown in FIG. 1, an information sequence D10 from a digital source (not shown), is applied to a serial-parallel (S/P) converter 10. The information sequence D10 is a bit sequence denoted by (B1, B2, B3, ..., B6, ...) in FIG. 2. The converter 10 transforms the bit sequence D10 into two bit sequences D21 (B1, B3, B5, ...) and D22 (B2, B4, B6, ...) as shown in FIG. 2. A convolutional encoder 21, having a ½ conversion rate, is supplied with the bit sequence D21 and generates two encoded sequences D31, D32 which are applied to the next stage, viz., a parallel-serial (P/S) converter 31. The encoded sequence D31 is represented by (P1, P3, P5, ...) while the other encoded sequence D32 by (Q1, Q3, Q5, ...) in FIG. 2. Similarly, a convolutional encoder 22, having the same configuration as the encoder 21, receives the bit sequence D22 and generates two encoded sequences D33, D34 which are applied to a P/S converter 32. The encoded sequence D33 is represented by (P2, P4, P6, ...) while the other encoded sequence D34 by (Q2, Q4, Q6, ...) (FIG. 2). As is well known in the art, a convolutional encoder generally includes a plurality of shift registers for temporarily holding binary symbols and logical circuitry for producing the encoded sequences. A convolutional encoder itself is not directly concerned with the instant invention and hence further description thereof will be omitted for brevity. The two encoded sequences D31, D32 are combined into a bit sequence D43 (P1, Q1, P3, Q3, ...) by a P/S converter 31, while the two encoded sequences D33, D34 are transformed into a bit sequence D44 (P2, Q2, P4, Q4, ...). A QPSK (Quadriphase Shift Keying) modulator 40 modulates the two bit sequences D43, D44 applied thereto. The modulated signals are added to form the resultant QPSK signal which is transmitted over a channel.

The modulated signal is applied to a QPSK demodulator 50 which implements demodulation using a reproduced carrier (viz., reference signal) and outputs two received bit sequences D53, D54. It should be noted that the received bit sequences D53, D54 are not necessarily identical with the bit sequences D43, D44, respectively even if no transmission error exists. More specifically, the bits P1, P2 respectively included in the received sequences D53, D54, may take one of the following four combinations: (P1, P2), (/P2, P1), (/P1, /P2) and (P2, /P1) where a notation "/" denotes a phase shift of 90°.

It is assumed that the carrier is correctly reproduced at the receiving section including the demodulator 50 (viz., the phase of the reference signal is identical with that of the carrier). In this instance, the received bit sequences D53, D54 assume the configuration in FIG. 3, in which "r" attached to each of the received bits P1, P2, Q1, Q2, ... indicates that the corresponding bit is corrupted by transmission error. An S/P converter 61 receives the bit sequence D53 and transforms same into two sequences D65, D66. Similarly, an S/P converter 62 is supplied with the other bit sequence D54 and transforms same into two sequences D67, D68. The sequences D65, D66 are inputted to a Viterbi decoder 71 and undergo maximum-likelihood decoding using the Viterbi algorithm. The Viterbi decoder 71 applies an output sequence D73 to a P/S converter 80. Similarly, the other Viterbi decoder 72 is supplied with the sequences D67, D68 and generates an output sequence D74 which is applied to the P/S converter 80. It is assumed that each of the Viterbi decoders 71, 72 has corrected the aforesaid transmission errors merely for the sake of simplifying the description. Accordingly, the character "r" indicating a transmission error is not attached to each bit of the sequences D73, D74. It is understood that a bit sequence D81 derived from the P/S converter 80 is a replica of the information sequence D10.

On the other hand, it is assumed that the carrier is incorrectly reproduced such that each of the orthogonal phases of the reference signal shifts from a reference phase by 90°. In this case, the received bit sequences D53, D54 are as indicated in FIG. 4. The sequence D53 is transformed into two sequences D65, D66 by the S/P converter 71, while the sequence D54 is transformed into two sequences D67, D68. In the event that a so-called transparent code is used, each of the bit sequences D65–D66 and D67–D68 is arranged in a manner that each of the Viterbi decoders 71, 72 implements the normal operation on the data bits applied. The term "transparent code" implies that even if all of the codes applied to a Viterbi decoder are reversed, the Viterbi decoder is able to normally implement error correction. Consequently, the Viterbi decoder 71 applies the output sequence D73 to the P/S converter 80 to which the other bit sequence D74 is applied. Thus, the P/S converter 80 generate a bit sequence D81 which apparently differs from the original sequence D10.

FIG. 5 is a block diagram showing a second prior art technique. The arrangement of FIG. 5 differs from that of FIG. 1 in that: (a) the former arrangement further includes a P/S converter 31' and a S/P converter 61' and (b) a modulator 40' takes the form of BPSK (Binary PSK) and a demodulator 50' is arranged to demodulate the BPSK modulated signal applied thereto. FIG. 6 is a time chart of bit sequences appearing in the FIG. 5 arrangement.

The P/S converter 31' is provided to transform the two bit sequences D43, D44 into a sequence D95. The modulator 40' implements BPSK modulation using the sequence D95 and transmits the modulated signal to the demodulator 50' over the channel. The demodulator 50' recovers the modulating sequence D95 and applies the recovered sequence D96 to the S/P converter 61' which transforms the sequence D96 into two sequences D97, D98.

In the event that the S/P converter 61' correctly executes the serial-parallel conversion, then the sequences D97, D98 are respectively identical with the sequences D53, D54 as shown in FIG. 3. In this instance, the P/S converter 80 is able to output the replica of the original information sequence D10 as discussed in connection with FIG. 3.

However, assuming that the S/P converter 61' has failed to correctly implement the serial-parallel conversion and generated the bit sequences D97, D98 as shown in FIG. 6. The S/P converters 61, 62 respectively produce parallel sequences D65–D66 and D67–D68. In this instance, each of the Viterbi decoders 71, 72 is able to normally implement the error correcting operation. Accordingly, since the bit sequences D65–D66, D67–D68 of FIG. 6 correspond to the sequences D67–D68, D65–D66 of FIG. 3, there exists the probability that the resultant sequence derived from the P/S converter 80 will take the form of B2, B1, B4, B3, ... (it is assumed that the Viterbi decoders 71, 72 have successfully removed transmission errors if any).

SUMMARY OF THE INVENTION

It is therefore an object of the present invention to provide an error control coding arrangement which, if there exists the possibility that the Viterbi decoder (viz., error correcting decoder) operates normally but issues an erroneous bit sequence that enables the bit sequences applied the Viterbi decoder to take the form of a bit arrangement with which the Viterbi decoder no longer operates normally.

A first aspect of the present invention is deemed to come in a data transmission system having an encoding section and a decoding section, the encoding section comprising: a serial-parallel converter for converting an information bit sequence applied thereto into N bit sequences (N is an positive integer more than 2); N convolutional encoders arranged to respectively receive the N bit sequences, the N convolutional encoders each generating first and second bit sequences; and a QAM modulator, the modulator being coupled to receive the first and second bit sequences, the first and second bit sequences respectively modulating two carriers with a phase difference of $\pi/2$ radians with each other, the QAM modulator generating a modulated signal; the decoding section comprising: a QAM demodulator, the QAM demodulator being coupled to receive the modulated signal and implement QAM demodulation, the QAM demodulator generating N third bit sequences and N fourth bit sequences which respectively correspond to the first N bit sequences and the second N bit sequences; N error correcting decoders arranged to respectively receive one pair of the third and fourth bit sequences, each of the N error correcting decoders outputting a bit sequence; and a parallel-serial converter for converting the bit sequences produced from the N error correcting decoders into a bit sequence.

A second aspect of the present invention is deemed to come in a data transmission system having an encoding section and a decoding section, the encoding section comprising: a first serial-parallel converter for converting an information bit sequence applied thereto into two bit sequences; two convolutional encoders arranged to respectively receive the two bit sequences from the first serial-parallel converter, the two convolutional encoders each generating first and second bit sequences; and second and third parallel-serial converters, the second parallel-serial converter being coupled to receive the first bit sequences and converting the first bit sequences into a third bit sequence, the third parallel-serial converter being coupled to receive the second bit sequences and converting the second bit sequences into a fourth bit sequence; and a QAM modulator, the modulator being coupled to receive the third and fourth bit sequences, the third and fourth bit sequences respectively modulating two carriers with a phase difference of $\pi/2$ radians with each other, the QAM modulator generating a modulated signal; the decoding section comprising: a QAM demodulator, the QAM demodulator being coupled to receive the modulated signal and implementing QAM demodulation, the QAM demodulator generating fifth and six bit sequences which respectively correspond to the third and fourth bit sequences; two error correcting decoders arranged to respectively receive one pair of the fifth and sixth bit sequences, the two error correcting decoders outputting seventh and eighth bit sequences; and a third parallel-serial converter for converting the seventh and eighth bit sequences into a bit sequence.

A third aspect of the present invention is deemed to come in a data transmission system having an encoding section and a decoding section, the encoding section comprising: a first serial-parallel converter for converting an information bit sequence applied thereto into two bit sequences; two convolutional encoders arranged to respectively receive the two bit sequences from the first serial-parallel converter, the two convolutional encoders each generating first and second bit sequences; and first and second parallel-serial converters, the first parallel-serial converter being coupled to receive the first bit sequences and converting the first bit sequences into a third bit sequence, the second parallel-serial converter being coupled to receive the second bit sequences and converting the second bit sequences into a fourth bit sequence; a third serial-parallel converter coupled to convert the third and fourth bit sequences into a fifth bit sequence; and a binary PSK modulator, the modulator being coupled to receive the fifth bit sequence, the fifth bit sequence modulating a carrier, the binary PSK modulator generating a modulated signal; the decoding section comprising: a binary PSK demodulator, the binary PSK demodulator being coupled to receive the modulated signal and implementing binary PSK demodulation, the binary PSK demodulator generating sixth and seventh bit sequences; two error correcting decoders arranged to respectively receive one pair of the sixth and seventh bit sequences, the two error correcting decoders outputting eighth and ninth bit sequences; and a fourth parallel-serial converter for converting the eighth and ninth bit sequences into a bit sequence.

BRIEF DESCRIPTION OF THE DRAWINGS

The features and advantages of the present invention will become more clearly appreciated from the following description taken in conjunction with the accompanying drawings in which like blocks or bit sequences are denoted by like reference numerals and in which:

FIGS. 8 through 10 are time charts which illustrated the various bit sequences which appear in the FIG. 7 arrangement;

FIG. 12 is a time chart showing bit which are involved in and/or characterize the operation of the FIG. 11 arrangement.

FIG. 13 is a block diagram illustrating an embodiment of this invention that resembles the embodiment of FIG. 7.

DETAILED DESCRIPTION OF THE PREFERRED EMBODIMENTS

Figure 7:
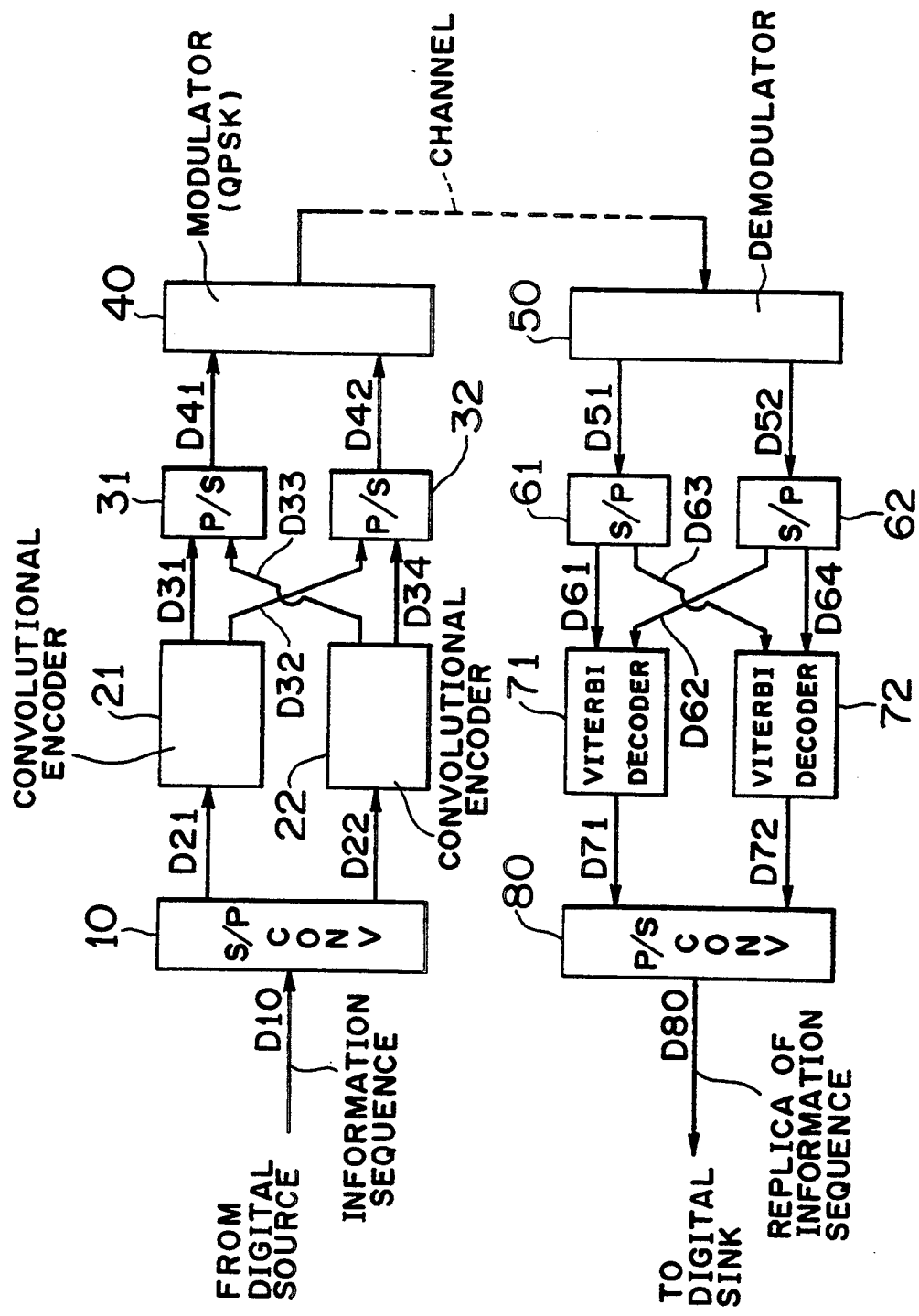
FIG. 7 is a block diagram schematically showing a first embodiment of the instant invention.

Reference is now made to FIG. 7, wherein there is shown a first embodiment of the present invention.

Figure 1:
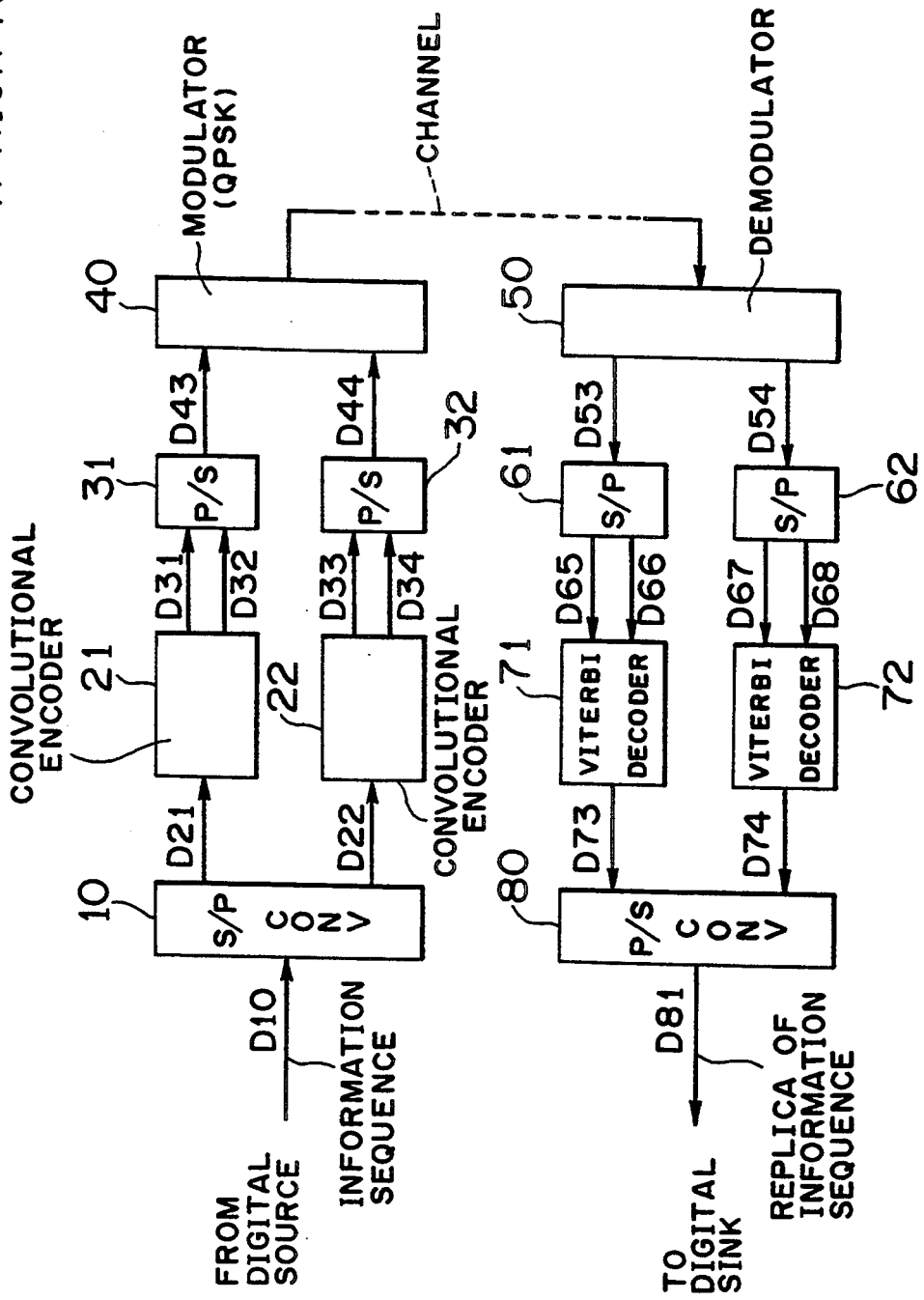
FIG. 1 is a block diagram schematically illustrating a first prior art arrangement referred to in the opening paragraphs of the instant specification.
Figure 2:
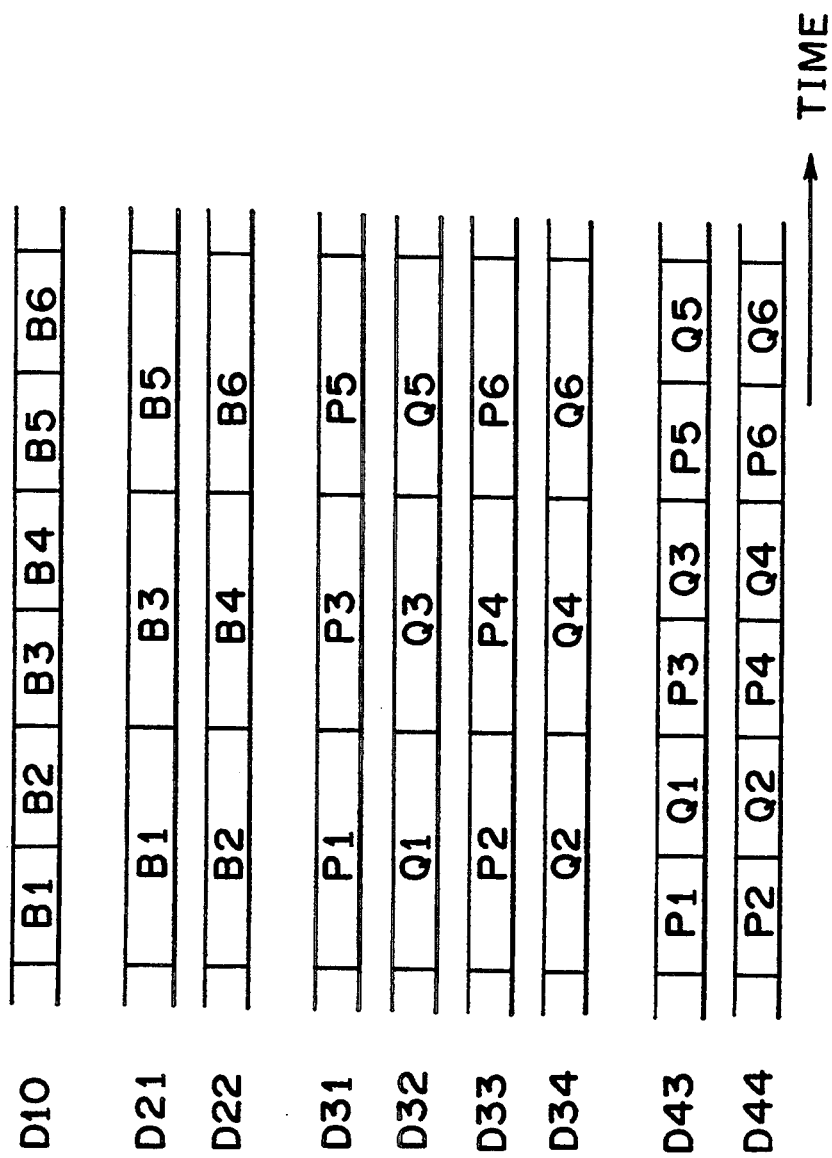
FIGS. 2 through 4 each is a time chart of various bit sequences appearing in the FIG. 1 arrangement.
Figure 3:
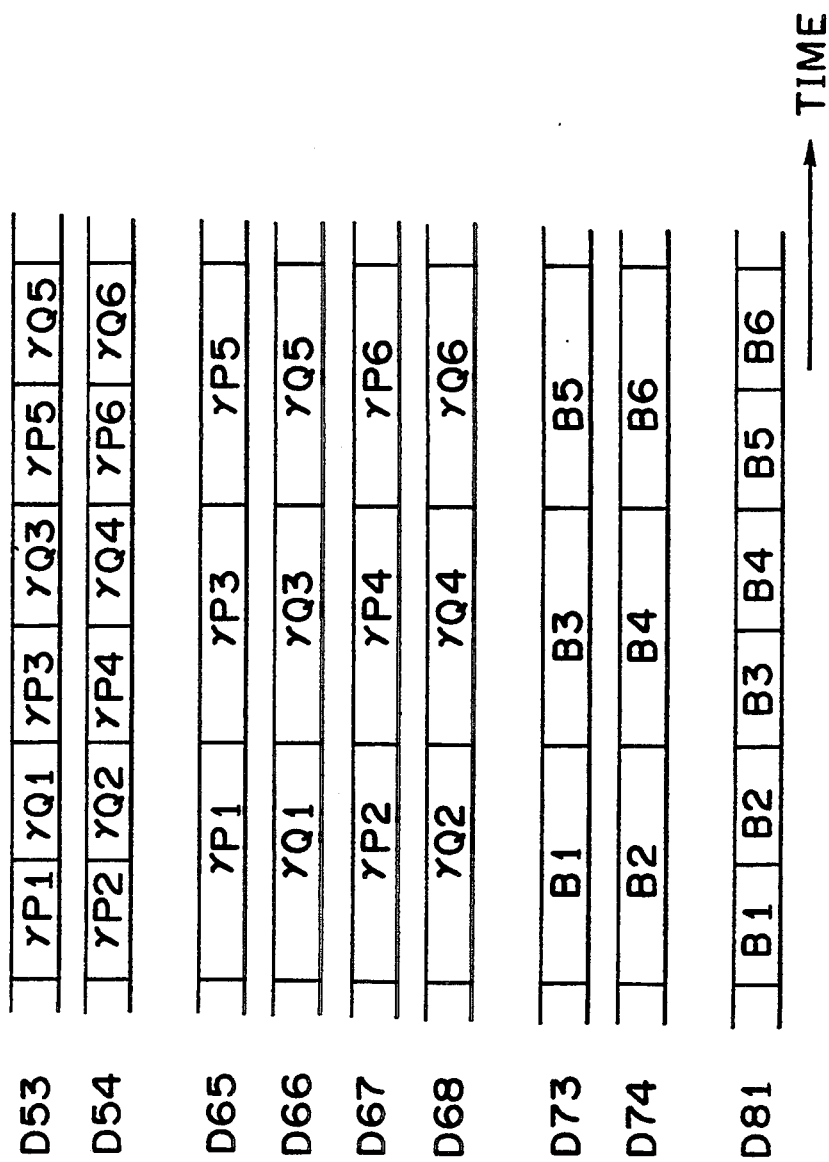
Figure 4:
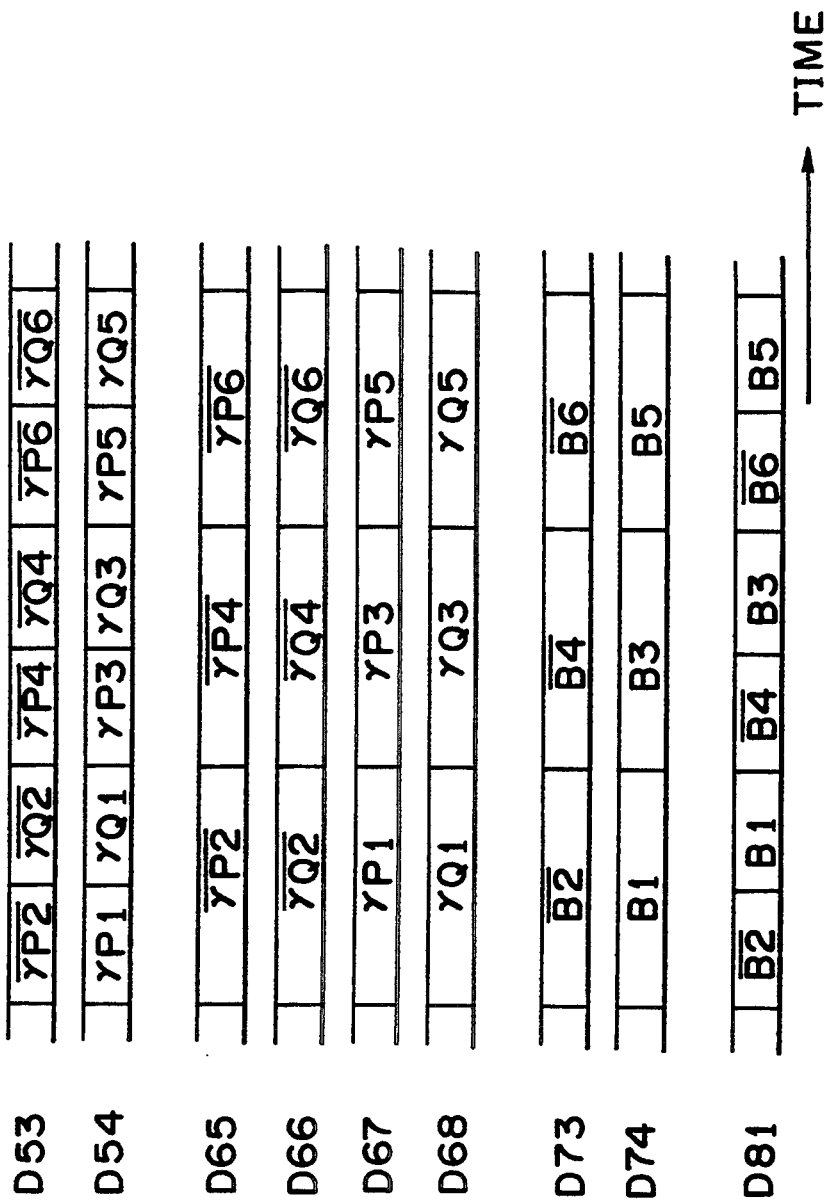
Figure 5:
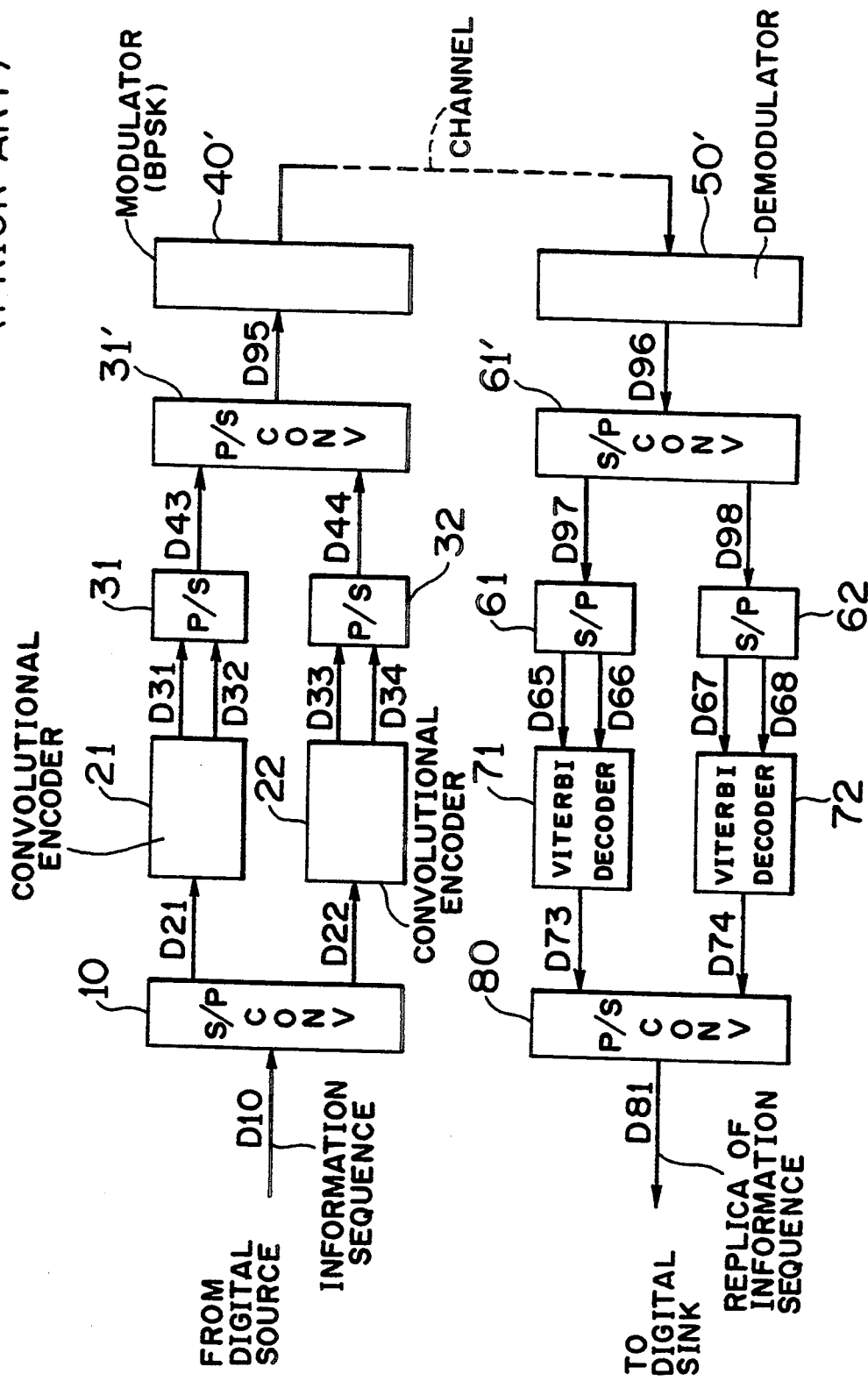
FIG. 5 is a block diagram schematically showing a second prior art arrangement referred to in the opening paragraphs of the instant specification.
Figure 6:
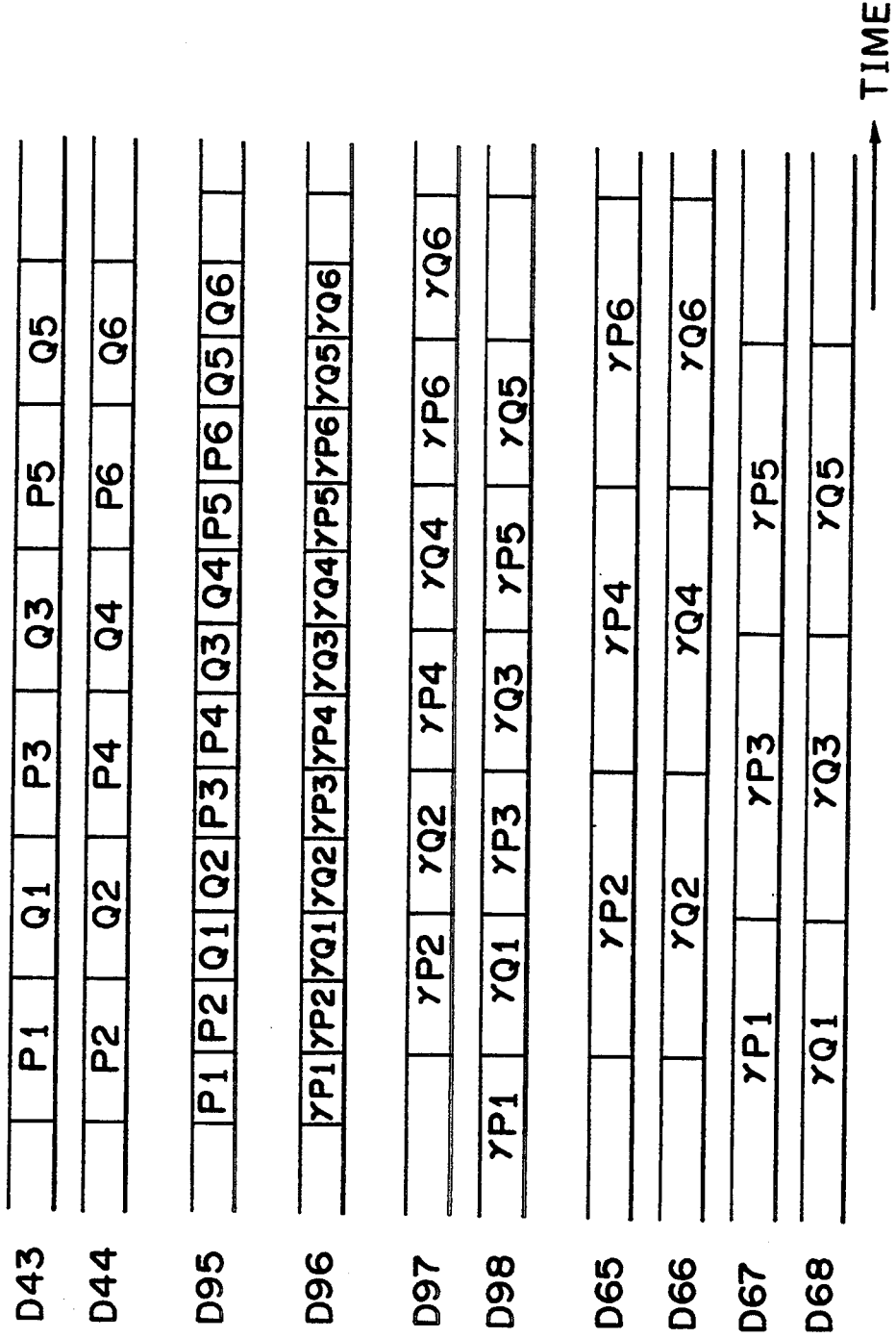
FIG. 6 is a time chart of various bit sequences appearing in the FIG. 5 arrangement.

The arrangement of FIG. 7 differs from that of FIG. 1 in that: (a) the connections of signal lines between the encoders 21, 22 and the converters 31, 32 are different from the latter arrangement and (b) the connections of signal lines between the converters 61, 62 and the Viterbi decoders 71, 72 are also different from the latter arrangement.

Figure 8:
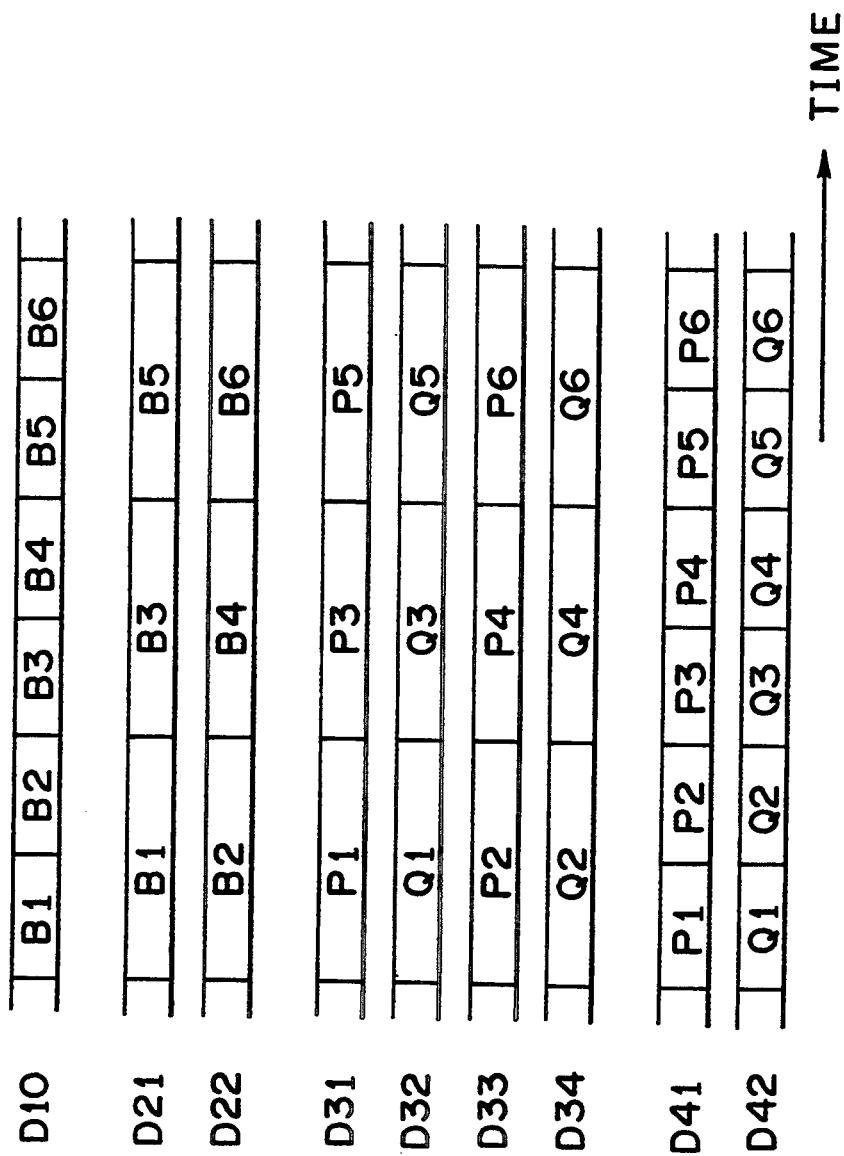

More specifically, the P/S converter 31 is arranged in a manner to convert the sequences D31, D33 respectively derived from the encoders 21, 22 into a single bit sequence D41 and, accordingly the sequence D41 takes the form of (P1, P2, ..., P6, ...) as illustrated in FIG. 8. On the other hand, the P/S converter 32 is arranged in a manner to convert the sequences D32, D34 respectively derived from the encoders 21, 22 into a single bit sequence D42. Thus, the sequence D42 is represented by (Q1, Q2, ..., Q6, ...) as shown in FIG. 8. The Viterbi decoder 71 is arranged in a manner to decode the sequences D61, D62 respectively applied thereto from the S/P converters 61, 62 into a single bit sequence D71. Similarly, the Viterbi decoder 72 is arranged in a manner to convert the sequences D63, D64 respectively applied thereto from the S/P converters 61, 62 into a single bit sequence D72.

The circuit operations and the bit sequences, which have been previously discussed, will not be referred to for the sake of brevity.

It is assumed that the carrier is correctly reproduced in the receive section (viz., the phase of the reference signal for use in demodulating operation in the demodulator 50 is identical with that of the carrier). In this instance, received bit sequences D51, D52 are represented as shown in FIG. 9, in which "r" attached to each of the received bits P1, P2, ... Q1, Q2, ... represents that the corresponding bit is corrupted by transmission error. It is understood that the bit sequences D61, D62, D63 and D64 are denoted as in FIG. 9. The sequences D61, D62 applied to the Viterbi decoder 71 are respectively identical with the sequences D31, D32 outputted from the convolutional encoder 21, and hence the Viterbi decoder 71 operates normally. Similarly, the sequences D63, D64 applied to the Viterbi decoder 72 are respectively identical with the sequences D33, D34 produced from the convolutional encoder 22, and hence the Viterbi decoder 71 carries out the normal operation thereof. As a result, the sequence D80 is a replica of the information sequence D10 wherein it is assumed that the Viterbi decoders 71, 72 have properly corrected transmission errors.

On the other hand, if the carrier is incorrectly reproduced such that each of the orthogonal phases of the reference signal shifts from a reference phase by 90°, the received bit sequences D51, D52 are represented as shown in FIG. 10. The sequence D51 is transformed into the sequences D61, D63 by the S/P converter 61, while the sequence D52 is transformed into the sequences D62, D64. In this instance, it is understood that neither of the Viterbi decoders 71, 72 operate normally. It is known in the art that each of the Viterbi decoders 71, 72 may easily be arranged to monitor the bit error rate. When the bit error rate exceeds a threshold level, the Viterbi decoder issues an alarm signal. According to the present invention, each of the Viterbi decoders 71, 72 is provided with an arrangement (not shown) including two data paths for applying data bits of one channel to the other channel. One of the data paths is provided with a 90° phase-shifter. It is understood that if the above-mentioned alarm signal issues, this arrangement enables the bit sequences D61–D64 shown in FIG. 10 to make the bit sequences D61—D64 shown in FIG. 9. Consequently, the sequence D80 is the replica of the information sequence D10.

Further, in the event that the carrier is incorrectly reproduced such that each of the orthogonal phases of the reference signal shifts from a reference phase by 180°, each sequence applied to the Viterbi decoders 71, 72 is correctly arranged but each bit thereof is reversed. However, the undesirable effect due to the reversed bits can be removed using a known differential conversion technique outside the signal route extending from the encoders 21, 22 to the Viterbi decoders 71, 72.

The FIG. 7 arrangement is applicable to the other type orthogonal modulation system. For example, when the first embodiment is applied to a 16-level QAM arrangement, the modulator 40 and the demodulator 50 are respectively replaced by the counterparts of 16-level QAM. Further, the P/S converters 31, 32 and the S/P converters 61, 62 are omitted. In this case, the bit sequences D31–D34 are applied directly to the 16-level QAM modulator such that D31, D33 correspond to one axis and D32, D34 to the other axis.

Figure 11:
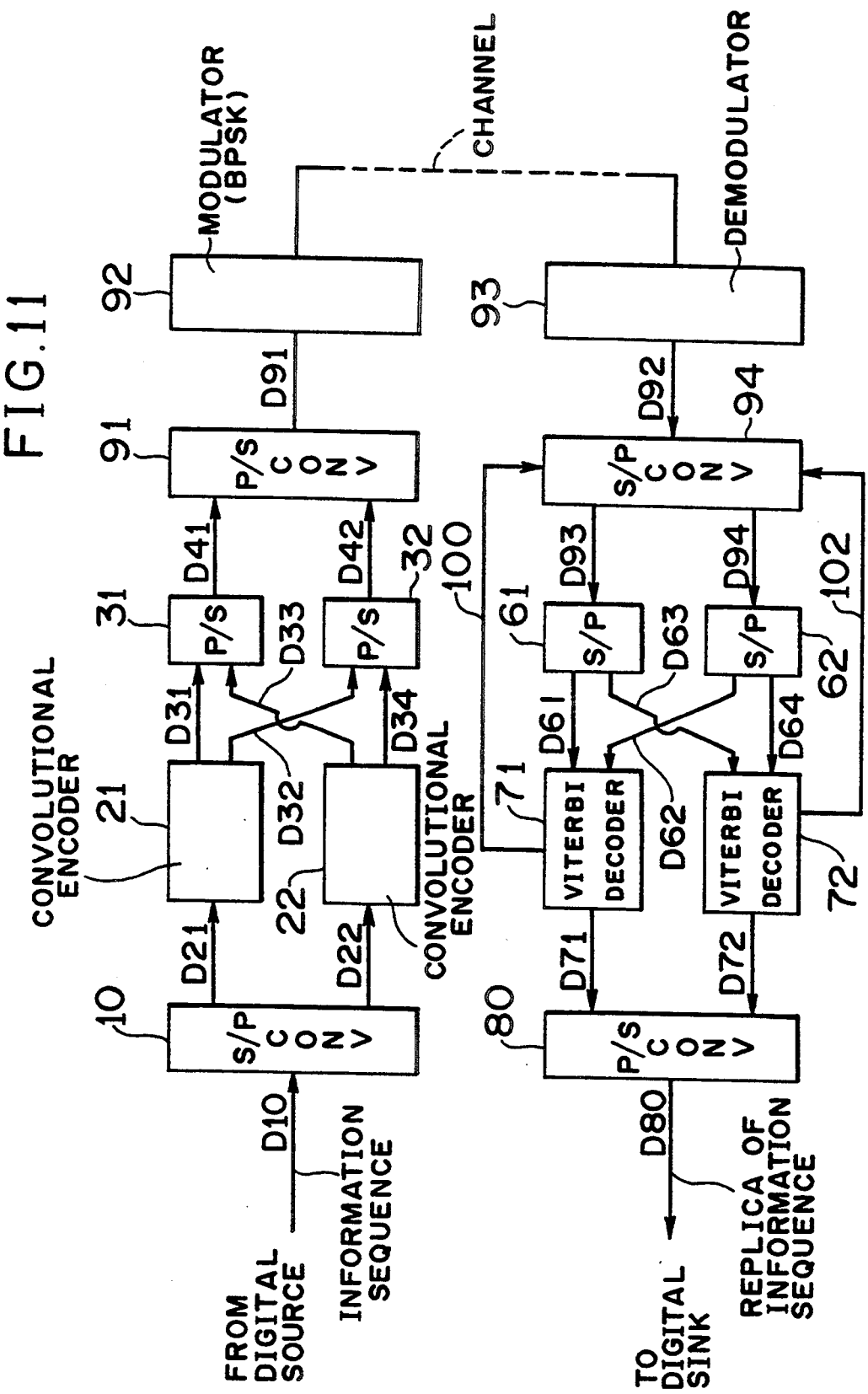
FIG. 11 is a block diagram schematically showing a second embodiment of the present invention.

FIG. 11 is a block diagram showing a second embodiment of the present invention. The arrangement of FIG. 11 differs from that of FIG. 7 in that: (a) the former arrangement further includes a P/S converter 91 and a S/P converter 94 and (b) a modulator 92 takes the form of BPSK (Binary PSK) and a demodulator 93 is arranged to demodulate the BPSK modulated signal applied thereto. FIG. 12 is a time chart of bit sequences produced by the FIG. 11 arrangement.

The P/S converter 91 is provided to transform the two bit sequences D41, D42 into a sequence D91. The modulator 92 implements BPSK modulation using the sequence D91 and transmitted the modulated signal to the demodulator 93 over the channel. The demodulator 93 recovers the modulating sequence D91 and applies the recovered sequence (denoted by D92) to the S/P converter 94 which transforms the sequence D92 into two sequences D93, D94.

In the event that the S/P converter 94 correctly executes the serial-parallel conversion, then the sequences D93, D94 are respectively identical with the sequences D51, D52 as shown in FIG. 9. In this instance, the P/S converter 80 is able to output the replica of the original information sequence D10 as discussed in connection with FIG. 9.

Contrarily, it is assumed that the S/P converter 94 has failed to correctly implement the serial-parallel conversion and generated the bit sequences D93, D94 as shown in FIG. 11. The S/P converters 61, 62 respectively produce parallel sequences D61, D63 and D62, D64. In this instance, each of the Viterbi decoders 71, 72 is unable to normally implement the error correcting operation.

As previously mentioned, it is known in the art that each of the Viterbi decoders 71, 72 may easily be arranged to monitor the bit error rate. When the bit error rate exceeds a threshold level, the Viterbi decoder issues an alarm signal. According to the second embodiment, the S/P converter 94 is supplied with the alarm signal from each of the Viterbi decoders 71, 72 via lines 100, 102, and forcibly changes the serial-parallel conversion in order that the replica of the information sequence D10 can be derived from the P/S converter 80. As an alternative, the bit sequences D93, D94 may be interchanged such that the former sequence D93 is inputted to the S/P converter 62 while the latter sequence D94 to the S/P converter 61.

In the above description, the Viterbi decoders are employed. However, other suitable error correcting decoder such as sequential decoder may be used.

Further, the S/P converter 10 in the first and second embodiments produces two parallel bit sequences. However, the converter 10 may be replaced by another S/P converter from which a plurality of bit sequences is derived. In this instance, the corresponding numbers of convolutional decoders and Viterbi decoders are required.

The system illustrated in FIG. 13 is for the most part the same in construction and operation as the system illustrated in FIG. 7, the differences being that:

(a) in FIG. 13 S/P converter 10 feeds four convolutional encoders 121-124 whereas in FIG. 7 S/P converter 10 feeds only two convolutional encoders 21, 22;

(b) in FIG. 13 each P/S converter 31, 32 is connected to receive signals from four convolutional encoders 121-124 whereas in FIG. 7 each P/S converter 31, 32 receives signals from only two convolutional encoders 21, 22;

(c) in FIG. 13 outputs D41, D42 of P/S converters 31, 32 are fed to modulator (4 QAM) 140 as opposed to FIG. 7 in which outputs D41, D42 are fed to modulator (QPSK) 40;

(d) in FIG. 13 each S/P converter 61, 62 provides an input to each of four Viterbi decoders 171-174 whereas in FIG. 7 each S/P converter 61, 62 provides an input to each of only two Viterbi decoders 71, 72; and (e) in FIG. 13 P/S converter 80 receives information from four Viterbi decoders 171-174 whereas in FIG. 7 P/S converter 80 receives information from only two Viterbi decoders 71, 72.

In view of the forgoing operational descriptions of the other embodiments herein, operation of the arrangement illustrated in FIG. 13 should be apparent to those skilled in the art to which this invention pertains.

While the foregoing description describes two embodiments of the present invention and one variant thereof, the various alternatives and modifications possible without departing from the scope of the present invention, which is limited only by the appended claims, will be apparent to those skilled in the art.

What is claimed is:

1. A data transmission system having an encoding section and a decoding section, said encoding section comprising:

a first serial-parallel converter for converting an information bit sequence applied thereto into N bit sequences (N is a positive integer more than 2);

N convolutional encoders arranged to respectively receive said N bit sequences, each of said N convolutional encoders generating first and second bit sequences;

first and second parallel-serial converters, said first parallel-serial converter arranged to convert the first bit sequence of each of said N convolutional encoders into a third bit sequence while said second parallel-serial converter is arranged to convert the second bit sequence of each of said N convolutional encoders into a fourth bit sequence;

a QAM modulator coupled to receive the third bit sequence as an in-phase component input and receive the fourth bit sequence as a quadrature component input, said QAM modulator generating a modulated signal;

said decoding section comprising:

a QAM demodulator coupled to receive said modulated signal, said QAM demodulator generating a fifth bit sequence and a sixth bit sequence which respectively correspond to said third bit sequence and said fourth bit sequence;

second and third serial-parallel converters, said second serial-parallel converter arranged to convert said fifth bit sequence into N seventh bit sequences while said third serial-parallel converter is arranged to convert said sixth bit sequence into N eighth bit sequences;

N Viterbi decoders, each of said N Viterbi decoders being arranged to receive one of said N seventh bit sequences and one of said N eighth bit sequences, each of the N Viterbi decoders outputting a single bit sequence; and a third parallel-serial converter for converting the single bit sequence applied from each of said N Viterbi decoders into a bit sequence;

whereby said system operates normally in the absence of an error and, whereby in the event of the error, said N seventh bit and N eighth bit sequences applied to each of said N Viterbi decoders take the form of a bit arrangement with which the N Viterbi decoders will no longer operate normally and an alarm signal will be issued.

2. A data transmission system having an encoding section and a decoding section, said encoding section comprising:

a first serial-parallel converter for converting an information bit sequence applied thereto into first and second other bit sequences;

first and second convolutional encoders arranged to respectively receive said first and second other bit sequences, each of said convolutional encoders generating first and second bit sequences;

first and second parallel-serial converters, said first parallel-serial converter arranged to convert the first bit sequence of each of said first and second convolutional encoders into a third bit sequence while said second parallel-serial converter is arranged to convert the second bit sequence of each of said first and second convolutional encoders into a fourth bit sequence;

a QAM modulator coupled to receive the third bit sequence as an in-phase component input and receive the fourth bit sequence as a quadrature component input, said QAM modulator generating a modulated signal, said decoding section comprising:

a QAM demodulator coupled to receive said modulated signal, said QAM demodulator generating a fifth bit sequence and a sixth bit sequence which respectively correspond to said third bit sequence and said fourth bit sequence;

second and third serial-parallel converters, said second serial-parallel converter arranged to convert said fifth bit sequence into first and second seventh bit sequences while said third serial-parallel converter is arranged to convert said sixth bit sequence into first and second eighth bit sequences;

first and second Viterbi decoders, each of said Viterbi decoders being arranged to receive one of said seventh bit sequences and one of said eighth bit sequences, each of said Viterbi decoders outputting a single bit sequence; and a third parallel-serial converter for converting the single bit sequence applied from each of said Viterbi decoders into a bit sequence;

whereby said system operates normally in the absence of an error and, whereby in the event of the error, said seventh and eighth bit sequences applied to said first and second Viterbi decoders take the form of a bit arrangement with which the Viterbi decoders will no longer operate normally and an alarm signal will be issued.

3. A data transmission system having an encoding section and a decoding section, said encoding section comprising:

a first serial-parallel converter for converting an information bit sequence applied thereto into first and second other bit sequences;

first and second convolutional encoders arranged to respectively receive said first and second other bit sequences from said first serial-parallel converter, each of said first and second convolutional encoders generating first and second bit sequences; and first and second parallel-serial converters, said first parallel-serial converter coupled to receive the first bit sequence of each of said first and second convolutional encoders and convert them into a third bit sequence while said second parallel-serial converter is coupled to receive the second bit sequence of each of said first and second convolutional encoders and convert them into a fourth bit sequence;

a third parallel-serial converter coupled to convert said third and fourth bit sequences into a fifth bit sequence; and a binary PSK modulator coupled to receive said fifth bit sequence which modulates a carrier, said binary PSK modulator generating a modulated signal;

said decoding section comprising:

a binary PSK demodulator coupled to receive said modulated signal and implementing binary PSK demodulation, said binary PSK demodulator generating a sixth bit sequence;

a second serial-parallel converter being coupled to convert said sixth bit sequence into seventh and eighth bit sequences;

third and fourth serial-parallel converters, said third serial-parallel converter being arranged to convert said seventh bit sequence into first and second ninth bit sequences while said fourth serial-parallel converter is arranged to convert said eighth bit sequence into first and second tenth bit sequences;

first and second Viterbi decoders, each of said Viterbi decoders arranged to receive one of said ninth bit sequences and one of said tenth bit sequences, each of said Viterbi decoders generating a single bit sequence; and a fourth parallel-serial converter coupled to convert the single bit sequence from each of said Viterbi decoders into a bit sequence;

whereby said system operates normally in the absence of an error and, whereby in the event of the error, said ninth and tenth bit sequences applied to said first and second Viterbi decoders take the form of a bit arrangement with which the Viterbi decoders will no longer operate normally and an alarm signal will be issued.

* * * * *